Patented July 27, 1926.

1,593,902

UNITED STATES PATENT OFFICE.

ANTON JAHL, OF HAMBURG-HORN, GERMANY, ASSIGNOR TO THE FIRM, J. MICHAEL & CO., OF BERLIN, GERMANY.

PROCESS OF PRODUCING BARIUM CHLORIDE.

No Drawing. Original application filed March 6, 1924, Serial No. 697,410, and in Germany December 5, 1922. Divided and this application filed November 4, 1924. Serial No. 747,867.

My invention relates to the production of soluble barium salts more particularly from barium sulphide, as described in my application, Ser. No. 697,410, filed on March 6, 1924, Patent No. 1,529,435 of which this is a division.

Attempts have been made to prepare soluble barium salts especially the chloride and nitrate by direct double decomposition with the corresponding alkali metal salt, instead of by using the corresponding acid as at present.

These attempts have been unsuccessful, because the operation results in the precipitation of a sulphur containing salt and not the pure chloride or nitrate, which sulphur containing salt it is very difficult to purify.

A further possibility has been indicated in a process in which a hydrosulphide solution is produced by passing hydrogen sulphide through a barium sulphide solution, and this hydrosulphide solution is decomposed with the corresponding alkali salt. But, it appears, that this reaction does not give any practical result when solutions are used which are not saturated with hydrogen sulphide.

The complete saturation with hydrogen sulphide is, however, scarcely possible, because it is absorbed so slightly at the start. An excess of hydrogen sulphide must therefore be employed, and the saturated solution smells strongly of hydrogen sulphide which is very unpleasant. To carry out all these operations in a closed vessel is practically impossible.

A solution incompletely saturated can be treated like other liquids in an open vessel without inconvenience due to evolution of the gas. On mixing with alkali salts, however, it gives rise to the disadvantage of the first described process.

The present invention has, for its object to overcome these difficulties and render possible the production of barium salts by double decomposition with alkali salts. According to my invention, a solution of barium sulphide incompletely saturated with hydrogen sulphide is decomposed with an alkali salt, e. g. sodium chloride, by which means there is formed the above mentioned complex sulphur-containing compound of barium. This is treated with either a cold or warm saturated solution of the corresponding barium salt, e. g. barium chloride where sodium chloride has been employed. As a result of this proceeding, the pure crystalline barium salt is obtained. The sulphur containing residue as well as the sodium chloride go into solution, and this solution is united with the initial barium sulphide and precipitated again with sodium chloride.

Instead of decomposing the complex compound with the barium salt, this baruim salt can be added previously and the formation of the complex compound avoided.

*Example I.*—An aqueous solution of barium sulphide is incompletely saturated with hydrogen sulphide. A solution is formed of 35 gms. barium sulphide and 400 gms. barium hydrosulphide in a litre. 300 litres of this solution are heated to boiling, 96 kilograms of sodium chloride are added and stirred to dissolve. On cooling, impure crystalline barium chloride separates out. By the boiling of the mother liquors down to half their volume a complex salt is formed as a precipitate, which consists of barium, sodium, chlorine and sulphur, while the solution contains pure sodium hydrosulphide. The impure barium chloride and the complex salt give by washing with saturated barium chloride solution, pure barium chloride. The wash liquors are added to the barium sulphide solution in the next operation.

*Example II.*—An aqueous solution of barium sulphide is incompletely saturated with hydrogen sulphide. A solution is formed containing 160 grams barium sulphide and 232 grams of barium hydrosulphide in a litre.

To 300 litres of this solution 120 kilograms of crystalline barium chloride and 73 kilograms of sodium chloride are added; the mixture is heated to boiling and after solution of the salt cooled. Pure barium chloride crystallizes out. The mother liquor concentrated to half its volume by the boiling gives on cooling the complex barium chloride salt as precipitate.

I claim as my invention:—

1. The process of producing barium chloride which comprises preparing a solution containing barium sulphide and barium hydrosulphide, adding thereto solid barium chloride, and treating the solution with an alkali metal chloride.

2. The process of producing barium chloride which comprises bringing a solution containing barium sulphide into contact with hydrogen sulphide to form a solution containing barium sulphide and barium hydrosulphide, adding thereto solid barium chloride, and treating the solution with an alkali metal chloride.

3. The process of producing barium chloride which comprises bringing a solution containing barium sulphide into contact with hydrogen sulphide to form a solution containing barium sulphide and barium hydrosulphide, adding thereto solid barium chloride, and treating the solution with sodium chloride.

4. The process of producing barium chloride which comprises preparing a solution containing barium sulphide and barium hydrosulphide, adding thereto solid barium chloride, and treating the solution with sodium chloride.

In testimony whereof I affix my signature.

ANTON JAHL.